July 25, 1939.  W. R. McCURDY ET AL  2,167,248
FORMATION OF COURSEWISE INTEGRALLY KNITTED
HEEL AND INSTEP STOCKING STRUCTURES
Filed Feb. 19, 1938  9 Sheets-Sheet 1
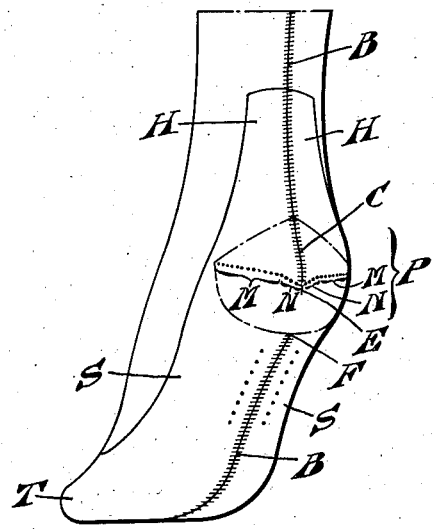
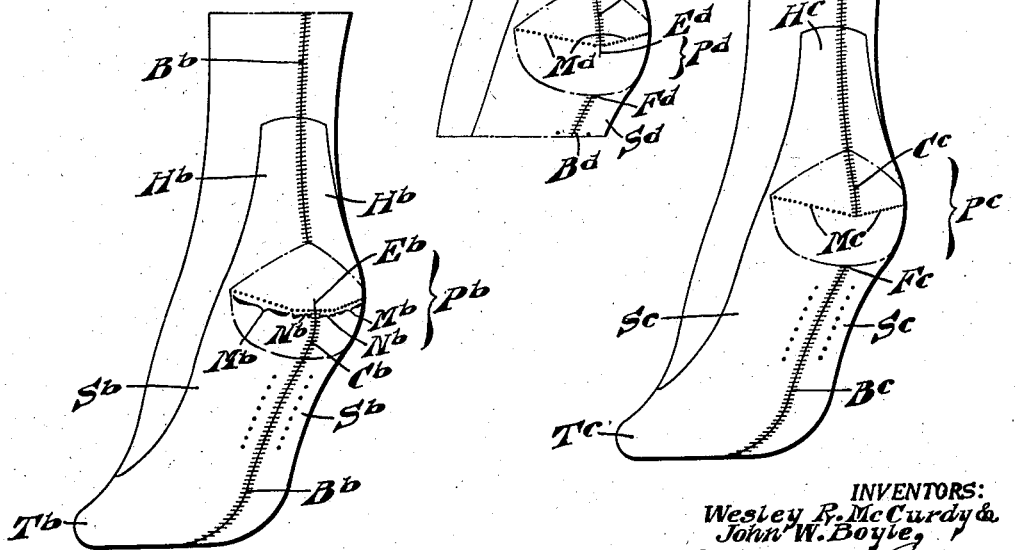
INVENTORS:
Wesley R. McCurdy &
John W. Boyle,
BY
ATTORNEY.

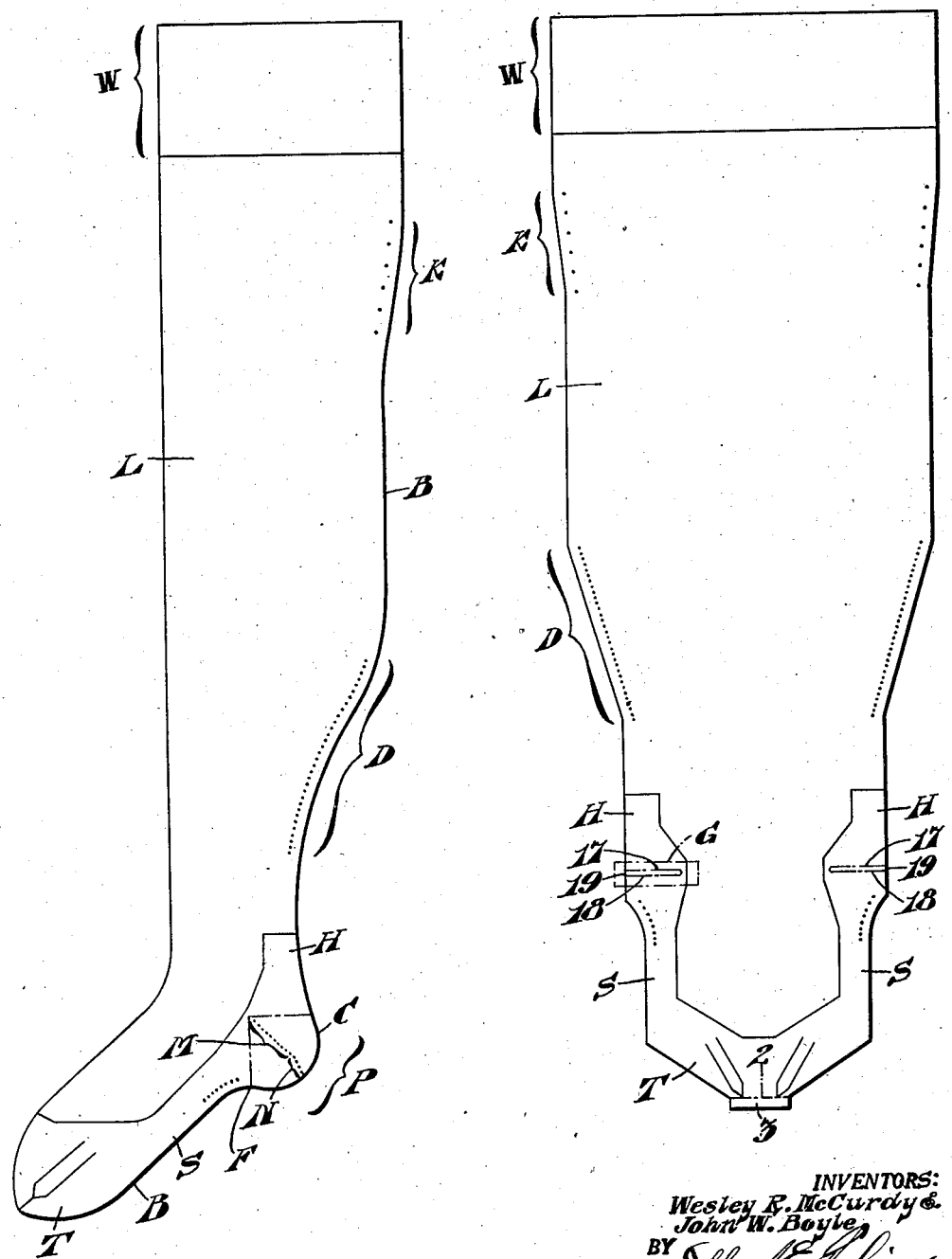

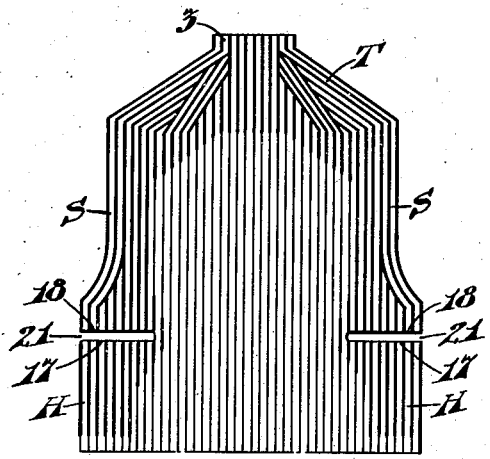
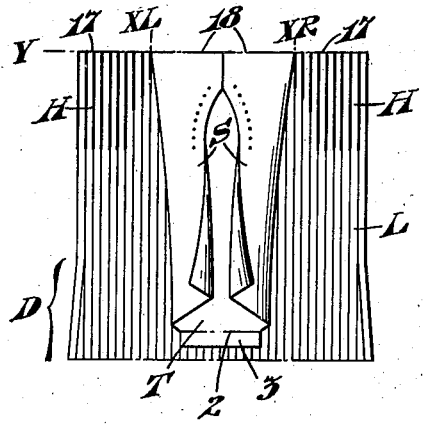
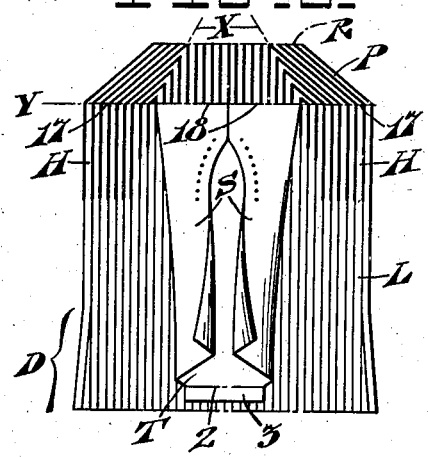
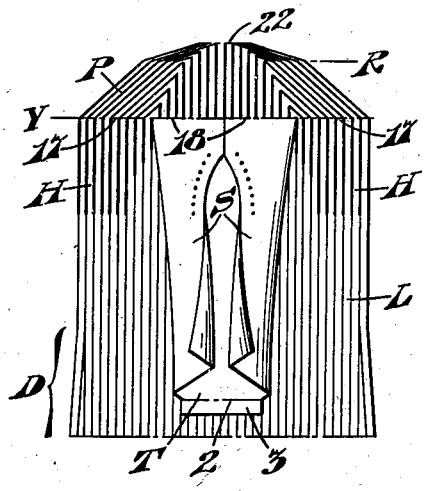

INVENTORS:
Wesley R. McCurdy &
John W. Boyle,
BY
ATTORNEY.

July 25, 1939.　　　W. R. McCURDY ET AL　　　2,167,248
FORMATION OF COURSEWISE INTEGRALLY KNITTED
HEEL AND INSTEP STOCKING STRUCTURES
Filed Feb. 19, 1938　　　9 Sheets-Sheet 5
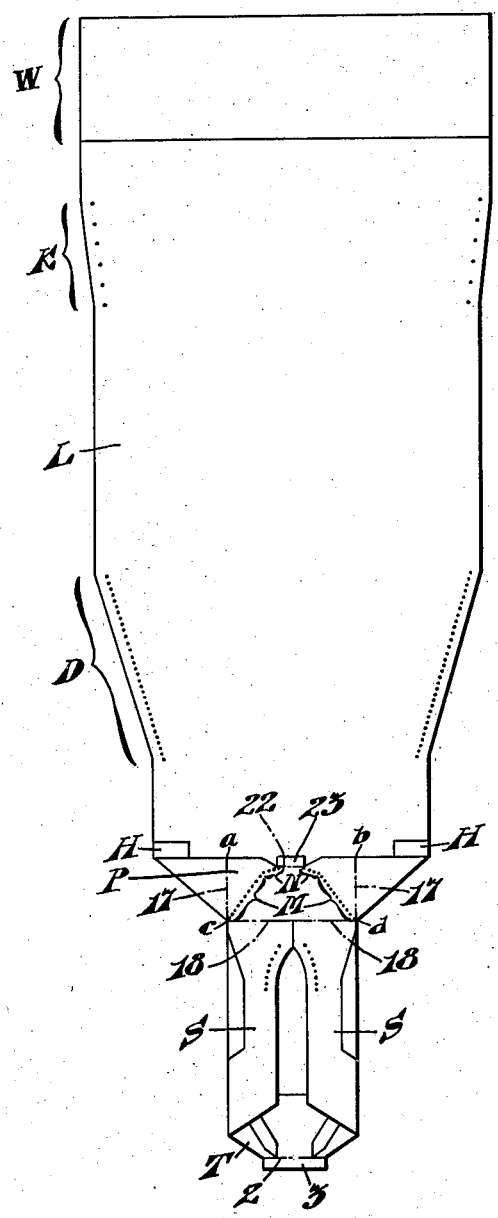
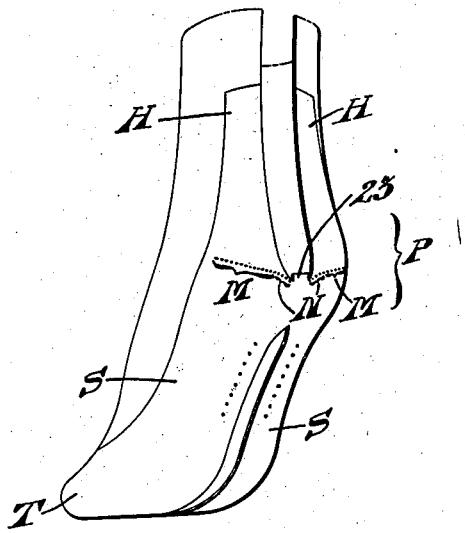
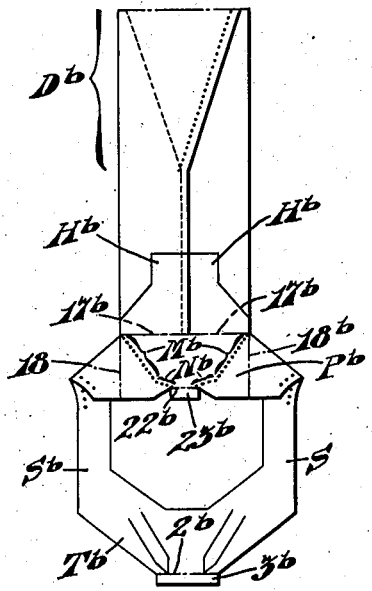
INVENTORS:
Wesley R. McCurdy &
John W. Boyle,
BY
ATTORNEY.

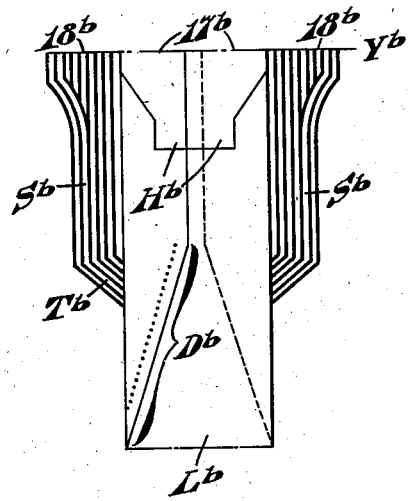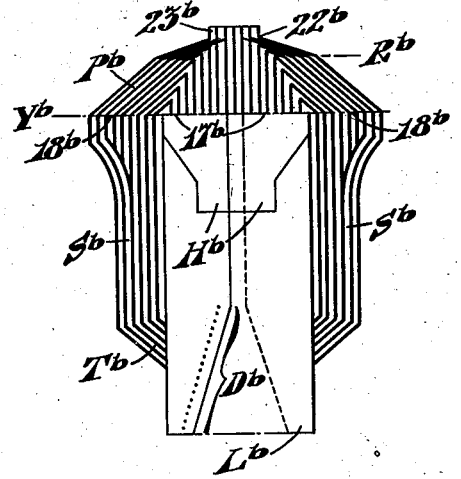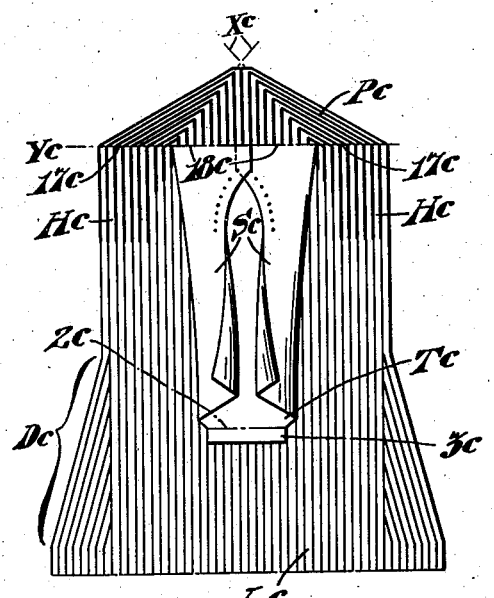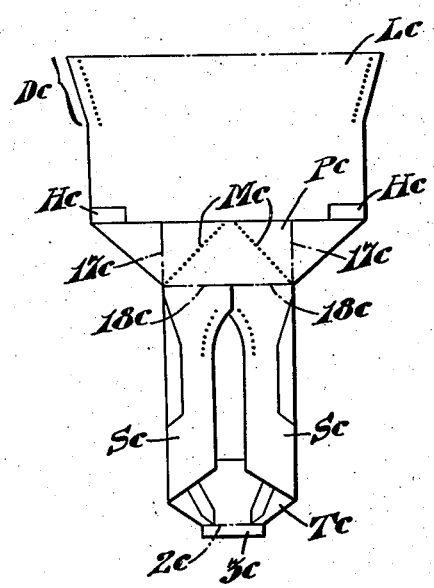

July 25, 1939.   W. R. McCURDY ET AL   2,167,248
FORMATION OF COURSEWISE INTEGRALLY KNITTED
HEEL AND INSTEP STOCKING STRUCTURES
Filed Feb. 19, 1938   9 Sheets-Sheet 7
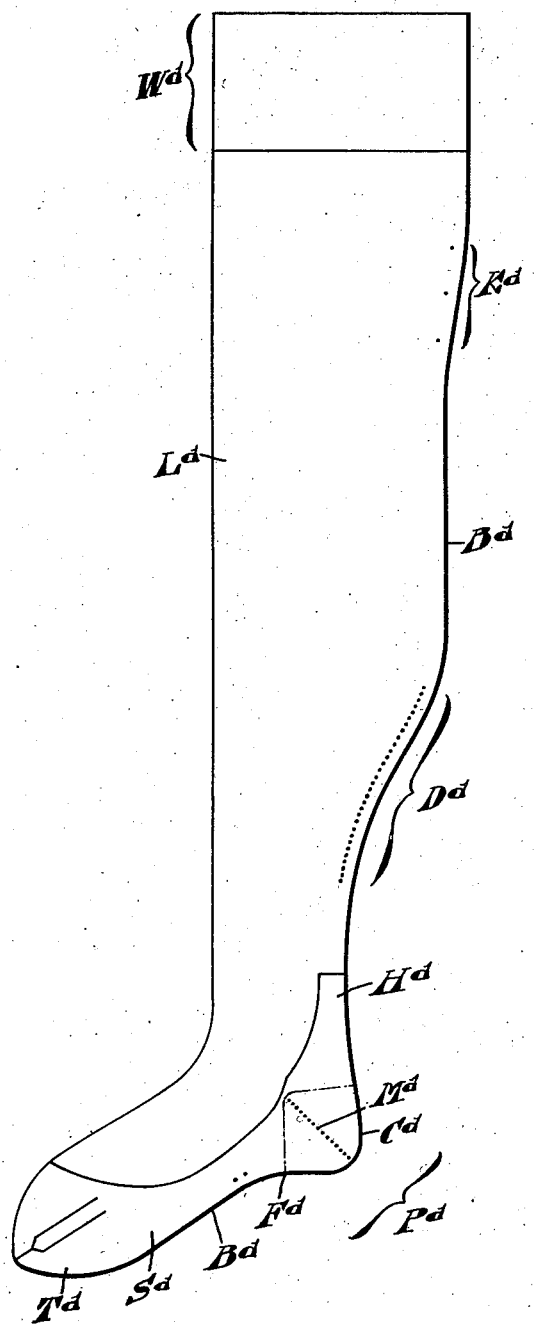
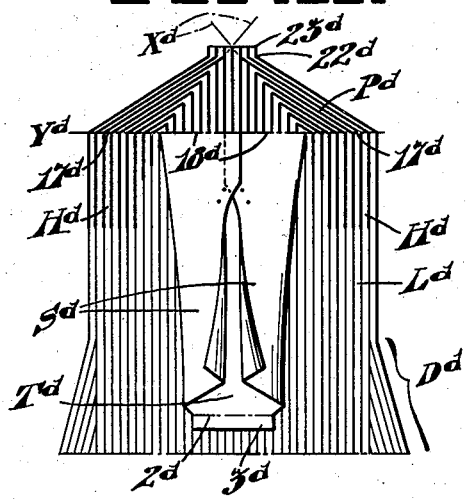
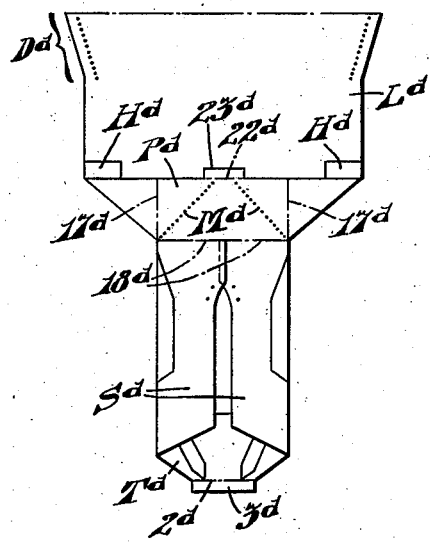
INVENTORS:
Wesley R. McCurdy &
John W. Boyle,
BY
ATTORNEY.

July 25, 1939.    W. R. McCURDY ET AL    2,167,248
FORMATION OF COURSEWISE INTEGRALLY KNITTED
HEEL AND INSTEP STOCKING STRUCTURES
Filed Feb. 19, 1938    9 Sheets-Sheet 8
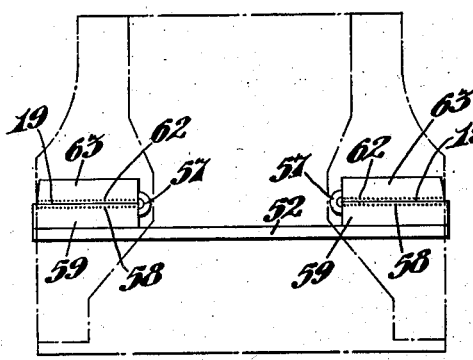
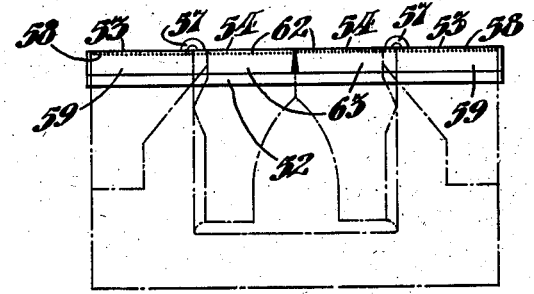
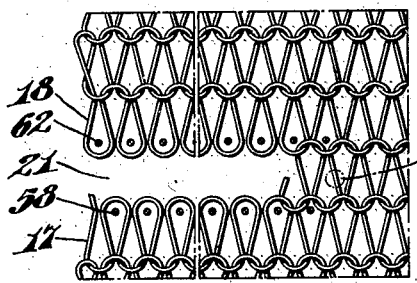
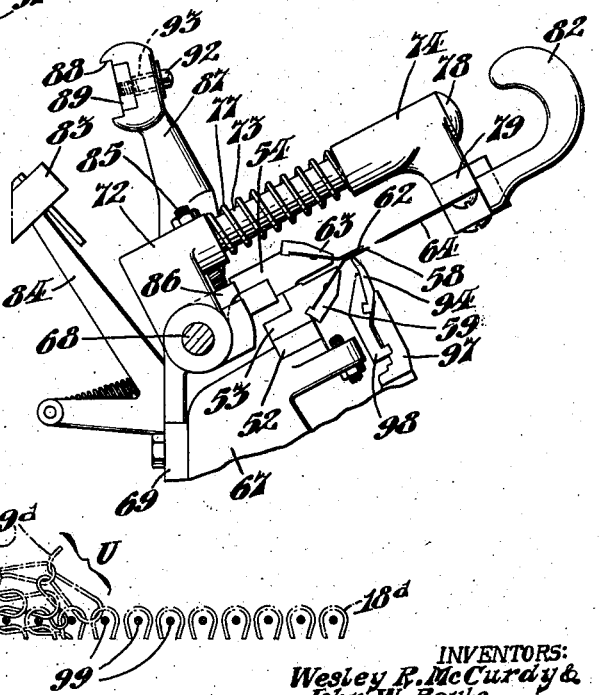
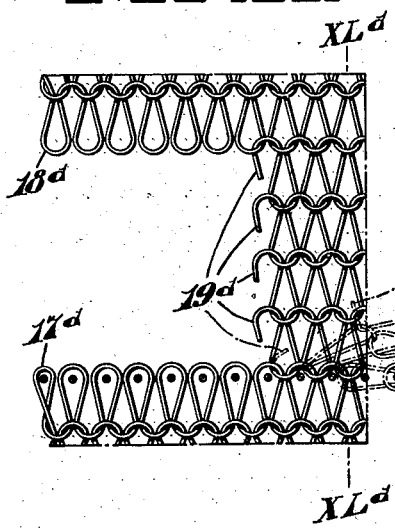
INVENTORS:
Wesley R. McCurdy &
John W. Boyle,
BY
ATTORNEY.

July 25, 1939.  W. R. McCURDY ET AL  2,167,248
FORMATION OF COURSEWISE INTEGRALLY KNITTED
HEEL AND INSTEP STOCKING STRUCTURES
Filed Feb. 19, 1938   9 Sheets-Sheet 9
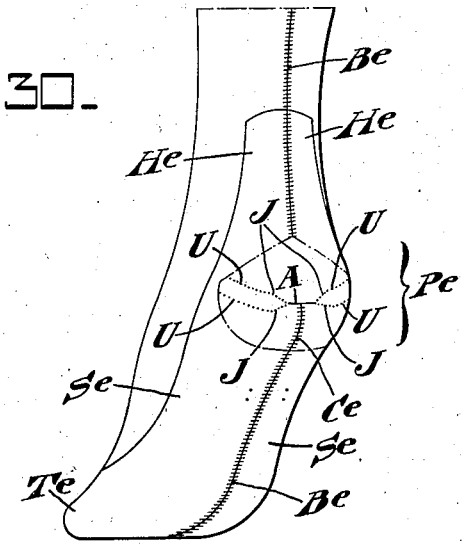
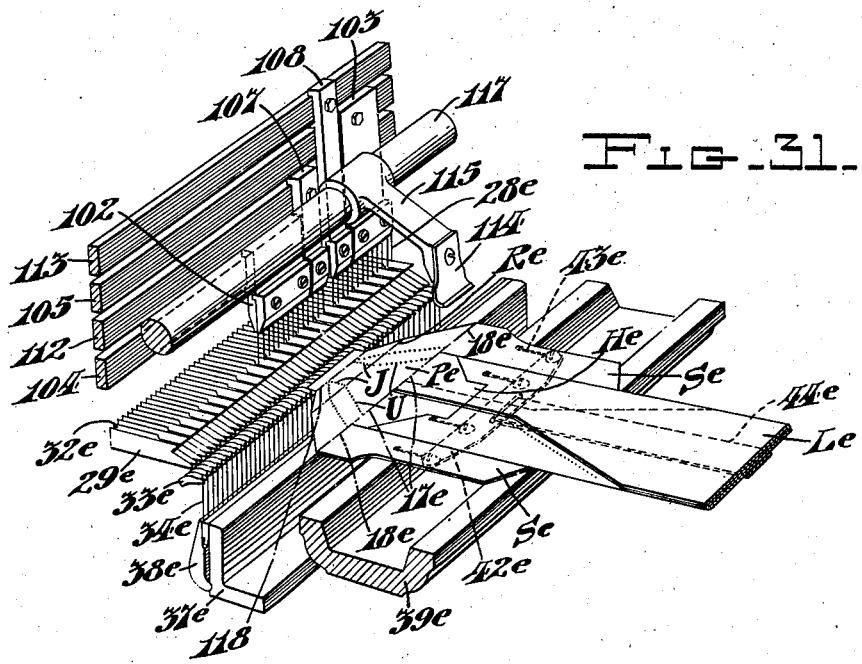
INVENTORS:
Wesley R. McCurdy &
John W. Boyle,
BY
ATTORNEY.

Patented July 25, 1939

2,167,248

UNITED STATES PATENT OFFICE 2,167,248

FORMATION OF COURSEWISE INTEGRALLY KNITTED HEEL AND INSTEP STOCKING STRUCTURES

Wesley R. McCurdy, St. Catharines, Ontario, and John W. Boyle, Merritton, Ontario, Canada Application February 19, 1938, Serial No. 191,412

3 Claims. (Cl. 66—89)

This invention relates to novel knitted fabric structures, particularly the heel portions of full fashioned stockings, and to a new method of producing them.

In the production of full fashioned stocking blanks, it has been usual to knit the welt, the leg portion, and the heel tabs of a stocking on a "legger" machine, and the remainder of the stocking on a "footer" machine.

The latter process generally results in a difference of shade or tone between areas of the instep knitted on the legger and the footer machines, respectively, resulting from differences in the spacing of the needles of the machines, from knitting the areas by yarns of different yarn sources, and from other causes.

A prior suggestion, for eliminating the above-mentioned difference of shade between the instep areas, is to knit an entire stocking blank on one machine in which a course of loops across the instep area is lifted by a point comb off the needles, and the comb, with the instep loops thereon, allowed to move in the fabric draw-off direction from the needles during the knitting of the heel tabs, after which the comb is moved back to the plane of the needle bank, and the instep loops on the comb are redeposited on the needles for completing the knitting of the foot portion of the stocking.

By another suggestion, the needle bar of a unit machine is split into one long central, or instep, section and two short end, or reinforced heel area, sections whereby the instep section, with an instep course of loops thereon, is moved in the take-off direction during the knitting of the heel tabs on the short end sections and moved back into alignment with the end sections for the completion of the stocking, with a result similar to that of the first above-mentioned suggestion.

Other suggestions contemplate the knitting of all of a full fashioned stocking blank on one machine, except the heel tabs, and to subsequently top on these tabs or a single heel pocket element that are formed separately from the main blank.

A further suggestion contemplates topping a main blank, produced by a unit machine to include all of a stocking blank except the heel pockets, onto needles and loop holding implements of a "heeler" machine, whereby, as the heel tabs are knitted, the loops of the first course portions in the sole areas at opposite sides of the blank, are transferred one at a time from the loop holding implements, above-mentioned, to inside selvage edge loops of the heel tabs, as the latter are produced.

Elements corresponding to the usual heel tabs are so knitted to the main blank at opposite sides of the walewise center line thereof as to very materially enhance the results sought by all of the cited illustrations, but, as stated, secures its result by simultaneously knitting two separate and distinct heel tab areas.

It is an object of this invention to avoid objections to all of the above-mentioned suggestions, and to provide a fabric and its method of production having advantages of their own, and in certain applications, to further the art in the production of full fashioned stocking heel pocket portions.

Another object of the invention is to provide a full fashioned stocking having no seam under the heel, in which the sides of the heel area match in size, shape and color, in which extra reinforcement may be knit under the heel without causing discomfort to the wearer, and in which there are only two selvages in the heel area, instead of four.

Another object of the invention is to provide a heel pocket element knitted in one piece to an otherwise complete full fashioned stocking blank, and to knit this piece in any of a variety of ways, such as having its outer end lengths knitted from the last course portions of the reinforced upper heel areas, or from the first course portions in the reinforced sole areas.

Another object of the invention is to simplify the operation of producing a full fashioned stocking heel, to render easier the control of the machine take off tension from the centralizing effect of the heel pocket element as knitted, to reduce the likelihood of unraveling in the blank or stocking, to lower or eliminate the number of loopings, to facilitate seaming, and to provide a variety of heel shapes.

Another object of the invention is to facilitate the production of a special heel pocket on a standard machine, to avoid a looping, a boned course or a seam between the heel and sole areas, and to give the stocking a better finished appearance whereby to render it more attractive to the trade, and render it a distinct improvement in the full fashioned hosiery field.

A further object of the invention is to provide a fabric of the above-indicated character that is simple and durable in construction, economical to manufacture, and satisfactory in service.

With these and other objects in view, which will become apparent from the following detailed description of the illustrative embodiment of the invention shown in the accompanying drawings, our invention resides in the novel elements, features of construction and arrangement of parts in cooperative relationship as hereinafter more particularly pointed out in the claims.

In the drawings:

Figure 1 is a rear view in perspective, of the lower portion of a full fashioned stocking as it appears in one service position, showing the foot portion, including a heel pocket element of one form of the invention, and a portion of the leg;

Fig. 2 is a view similar to Fig. 1 of a portion of a stocking embodying the invention in another form;

Fig. 3 is a view similar to Fig. 1 of a portion of a stocking embodying the invention in another form;

Fig. 4 is a view similar to a portion of Fig. 1 of the invention in further form;

Fig. 5 is a view, in side elevation, of a stocking including the parts of Fig. 1, as arranged or folded in its flat form;

Fig. 6 is a view of a one-piece combined leg and foot blank, minus the heel pocket element, from which any of the stockings of Figs. 1 to 5 is formed;

Figure 12:
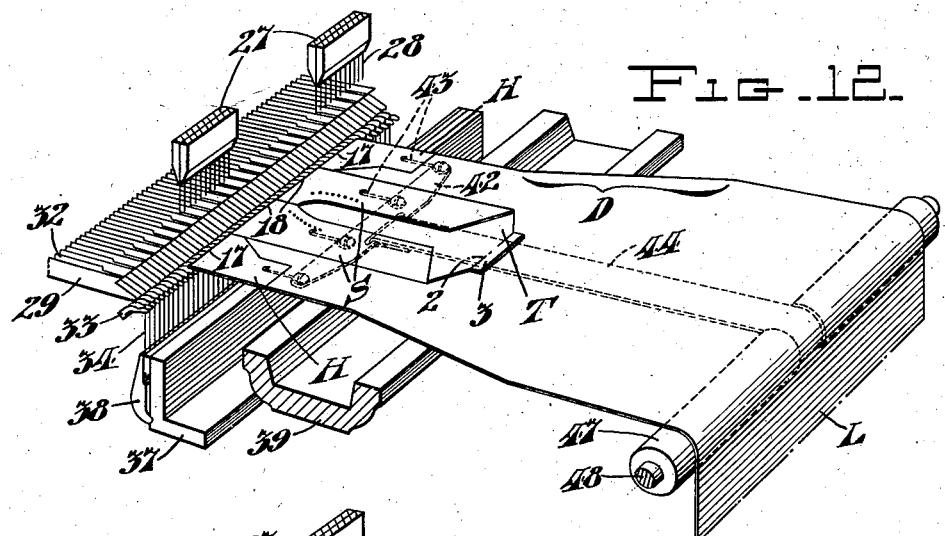
Figure 13:
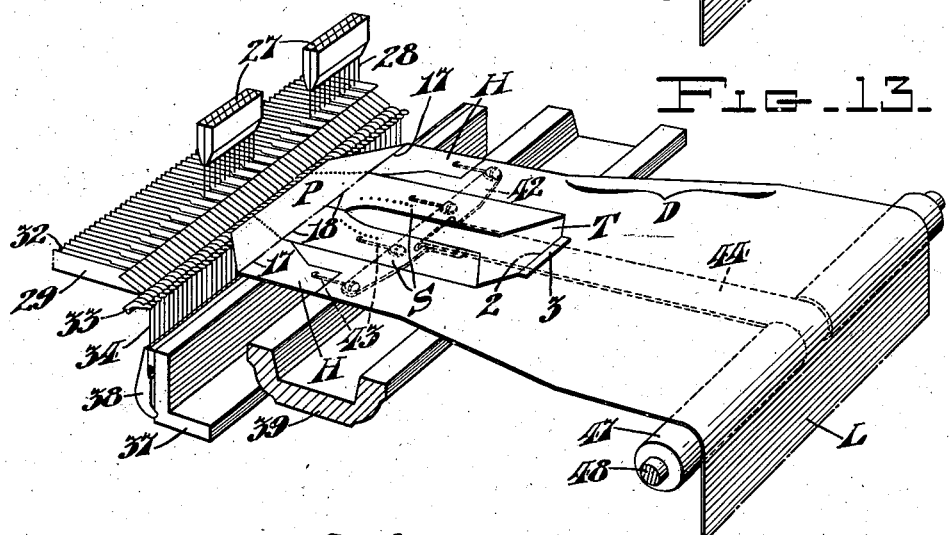
Figure 14:
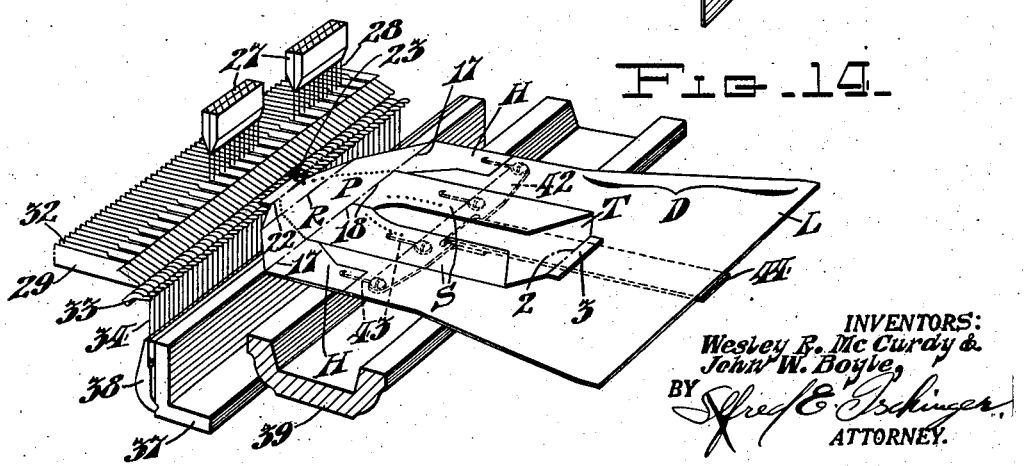

Figs. 7 to 11, inclusive, are sequence diagrams similar to the lower portion of Fig. 6, but inverted from the position thereof, which corresponds to the position of the stocking on the leg of a wearer, to the position of the blank as the fabric comes from the machine, showing successive steps in the production of the finished blank;

Figs. 12, 13 and 14 are perspective views of portions of the blank of Fig. 6, and of a machine for adding a heel pocket element of the invention also shown in the figures at the stages indicated in Figs. 8, 9 and 11, respectively;

Fig. 15 is a view showing the plan of the blank of Fig. 2, after the heel pocket element has been added;

Fig. 16 is a rear view in perspective, of the lower portion of a completed blank, with its selvage edges slightly spaced apart prior to producing the back seam between these edges, and completing the stocking as in Fig. 1;

Fig. 17 is a view of a blank that has been finished similarly to the blank of Fig. 15, but for making the stocking represented by Fig. 2;

Fig. 18 is a view of a blank from which the structure of Fig. 2 is produced, shown at a step in its production corresponding to the step of Fig. 8;

Fig. 19 is a view of the blank of Fig. 18, at the step in its production corresponding to Fig. 11;

Fig. 20 is a view of a blank from which the structure of Fig. 3 is formed, shown at a step in its production corresponding to the steps of Figs. 11 and 19;

Fig. 21 is a view of a portion of the finished blank for making the structure of Fig. 3, corresponding to the stages, represented by Figs. 15 and 17, for producing the structures of Figs. 1 and 2, respectively;

Fig. 22 is a view similar to Fig. 5 corresponding to the form of the invention of Fig. 4;

Fig. 23 is a view corresponding to Fig. 11 of the invention of Fig. 4;

Fig. 24 is a view similar to Fig. 21 of the structure of Fig. 4;

Figs. 25 and 26 are diagrams showing successive stages of manipulation of the one-piece leg and foot blank relative to elements of a topping machine which may be employed in preparing the blank to receive the heel pocket according to the invention;

Fig. 27 is a fragmentary side elevational view of the upper portions of a topping machine including the machine elements of Figs. 25 and 26, and showing a severing knife mechanism;

Fig. 28 is a magnified yarn loop diagram of an area G shown in dot-and-dash lines in Fig. 6, a part thereof having been removed;

Fig. 29 is a view of part of the invention in the forms of Figs. 4, 22, 23 and 24, showing in full lines a magnified yarn loop diagram similar to Fig. 28, and, in dot-and-dash lines certain of the loops after the fabric has been manipulated or folded from its complete full line original flat blank shape to a shape similar to Fig. 8 wherein certain of the dot-and-dash line loops are then in line with certain of the full line loops on the needles of a heeler machine;

Fig. 30 is a view similar to Fig. 2 of a stocking embodying a still further form of the invention; and Fig. 31 is somewhat on the order of Fig. 14, but shows narrowing rods and combs, and a covering knife, employed in the production of the stocking of Fig. 30.

In the drawings and description, only those parts rendering clear a complete understanding of the invention have been set forth, further information as to one means or parts thereof for practicing the method and producing the fabric of the invention, not herein specifically pointed out, but which are usual and well known, being available in the pamphlet entitled "Full Fashioned Knitting Machines", copyright 1920, also in the "Reading" Full Fashioned Knitting Machine Catalogues, copyright 1929 and 1935, published by the Textile Machine Works, Reading, Pennsylvania, and in the pamphlet entitled "Knitting Machine Lectures", published 1935, by the Wyomissing Polytechnic Institute, Wyomissing, Pennsylvania.

In the examples herein given, the invention is essentially a method of making a full fashioned stocking heel structure, although other applications for producing like fabrics, or parts thereof, are contemplated within the purview of the invention.

Referring to Figs. 1 and 5, a completed fabric, having parts produced according to one example of the invention, is a full fashioned stocking including a usual welt W, a leg portion L having knee and lower narrowing areas K and D, respectively, upper reinforced heel areas H, a heel area or pocket P, reinforced sole areas S, and a toe portion T. An outstanding distinction of this stocking, over all prior full fashioned stockings of which we are aware, resides in the fact that the area P, bounded by dot and dash lines in Fig. 1, is knitted directly to the remainder of the stocking, or to its blank before forming a usual back seam B, in one continuously knitted piece. In the form of Figs. 1 and 5, an entire blank, except the heel element P, is formed on a unit machine, and then transferred to a "heeler" machine, in such form, as will hereinafter be more completely described, as to require a portion C of the back seam B to extend into the heel pocket portion to a short length E of a seam or loopings aligned with the back seam. However, from the lower end of the seam portion or loopings E to the top or upper end F of a portion of the back seam B, between the sole portions S, the stocking, or heel pocket, is devoid of any back seam, and this portion of the stocking or heel is, in conjunction with the adjacent sole and instep areas, a tubular fabric element produced by knitting on a straight or full fashioned knitting machine. Thus, there is no back seam portion under the heel, at a place where such portion is annoying to certain wearers. In the structure of Fig. 1, fashioning of the heel pocket P is indicated by narrowing marks M extending along a line disposed at an angle to narrowing marks N, as will be hereinafter more fully described.

In the form of the invention illustrated in Fig. 2, in which corresponding parts are designated by corresponding reference characters having the suffix b, the method of forming, and the structure of, the stocking including the heel pocket, are similar to those above set forth, except in the folding of the blank and its mounting on the "heeler" machine, whereby the back seam portion Cb, instead of extending downwardly from the top of the heel pocket, as does the portion C of Fig. 1, extends upwardly from the bottom of the heel pocket, thereby removing the back seam from the heel area at a position higher on the heel than in the stocking of Fig. 1. Also, the narrowing marks Mb and Nb, which are formed similarly to the marks M and N, have a slightly different appearance by reason of slightly different location.

In the form of the invention illustrated in Fig. 3, in which parts corresponding to those previously set forth are designated by corresponding reference characters having the suffix c, the structure is closer in form to that of Fig. 1 than to that of Fig. 2, but is devoid of narrowings corresponding to the narrowing marks N, and has no seam portion or loopings corresponding to the seam portion or loopings E, as also will be hereinafter be more particularly pointed out. The narrowings represented by marks Mc are along straight lines Xc in the blank (Fig. 20) from the sides of the heel pocket element Pc to the lower end of the seam portion Cc where there are no loopings corresponding to the loopings E.

In the form of the invention illustrated in Figs. 4 and 22, in which parts corresponding to parts above set forth are designated by corresponding reference characters having the suffix d, the fabric is a compromise between the structure of Fig. 1 and the structure of Fig. 3, in that it has narrowings represented by marks Md along straight lines Xd in the blank (Fig. 23) from the sides of the heel pocket e'ement Pd to the lower end of the seam portion Cd. However, as distinguished from the structure of Fig. 3, the fabric of Fig. 4 has a seam portion or loopings Ed similar to the seam portion or loopings E of Fig. 1, and, as distinguished from the structure of Fig. 1, the structure of Fig. 4 has no narrowings corresponding to the marks N, but only the narrowings represented by the marks Md and corresponding to the loopings Mc of Fig. 3.

The stocking of Figs. 1 and 5, as constituted therein, but before the heel pocket element P is inserted, is produced from the blank of Fig. 6, which is not itself a part of the invention hereof, but only in combination with the new elements herein disclosed. It comprises, in one continuously knitted fabric, the welt W, the knee area K, the leg portion L, the lower leg portion D, the upper reinforced heel area H, the reinforced sole areas S, the toe area T which is of the diamond point type, a loose course 2 and a ravel area 3.

To prepare the blank of Fig. 6 for the reception of the heel pocket element P, it is provided, intermediate the reinforced upper heel areas H and the reinforced sole portions S, at each side of the walewise center line of the blank, with parallel course portions 17 and 18, in walewise register with each other, having a severing area 19, as of a row of loops, therebetween. The course portions 17 thus constitute the last course portions in the heel areas H, and the course portions 18 constitute the first course portions in the sole areas S.

As shown in Fig. 7, the lower portion of the blank of Fig. 6 is inverted from its position thereof, viewed as it comes from the front of the machine. As indicated in Fig. 7, slits 21 have been formed by the removal of the severing areas 19 of Fig. 6 whereby the course portions 17 and 18 are rendered separable from each other out of the plane of the blank, except at the inner ends thereof, for folding these course portions as in Fig. 8. As indicated in Fig. 8, the blank has been folded about walewise lines XR and XL, through points at approximately the inner ends of the slits 21 at the right and left hand sides, respectively, of the blank, and about a coursewise line Y substantially coincident with the slits 21 or the severing areas 19, between the course portions 17 and 18, thus placing the course portions 17 and 18 in substantial alignment with each other for topping needle loops of the course portions 17 and sinker loops of the course portions 18 onto adjacent rows of needles, respectively, and placing the course portions 18 inwardly from the course portions 17 relative to the corresponding selvage edge or side of the blank. It is to be understood that reference to sinker loops means sinker and divider loops. The blank, as shown in Fig. 8, is positioned as it is topped onto the needles of a "heeler" machine, as viewed from above at the front of the machine, with the foot portion folded or rolled inwardly at each side from the outer edges of the blank toward the center of the latter, where the foot portion rides on top of the leg portion during the knitting of the heel pocket element. As further shown in Fig. 8, the end loops of the course portions 18, which were originally the outer end loops thereof in the form of the blank of Figs. 6 and 7, are caused merely to meet, or be spaced a one needle distance apart, so that the first knitted course of the heel pocket element P interloops the meeting ends to ensure a good jointure therewith.

The knitting of the heel pocket element then proceeds, as indicated in Fig. 9, with narrowings being effected, as indicated by lines X along which the narrowing marks M of Figs. 1 and 2 are formed. It is to be understood that Figs. 9, 10 and 11 are merely conventional or diagrammatic to indicate the plan or sequence of actual knitting, but not the actual appearance of the fabric during the stages represented. The fabric, by reason of the narrowing and the fact that the heel pocket area P is being knitted to both course portions 17 and 18 simultaneously, takes a peculiar formation difficult of actual illustration, and resulting, when finished at the stage represented by Fig. 11, in having the heel pocket element P shaped substantially as a rectangle a, b, c, and d indicated in Fig. 15.

From the stage of production of Fig. 9, the blank proceeds through the stage of Fig. 10 which indicates that, in and after, a course R, the narrowings are varied to cause a more sudden inward slope of the edges of the pocket P to a short loose course 22, after which a short ravel area 23 is formed, as indicated in Fig. 11. The entire blank, as formed when the stage of Fig. 11 is reached, then appears as in Fig. 15, except for natural departures from the conventionalized form illustrated, caused by the delicate nature of the fabric and other factors.

The lower portion of the blank of Fig. 15 is illustrated in rear perspective in Fig. 16 somewhat on the order of illustration of the finally completed stocking portion of Fig. 1, but omitting the dot-and-dash lines defining the heel pocket element P in Fig. 1, which lines are shown merely to define the outline of the pocket, and not to indicate that there is any actual marking in the stocking corresponding to such lines. Fig. 16 further better illustrates the tubular nature of the blank for a length or distance in the heel pocket region, wherein the tubular portion is constructed entirely by knitting, and the short ravel area 23 at the upper end of the tubular portion is indicated as it exists prior to the formation of the loopings E of Fig. 1, and the removal of the ravel area, or the stitching thereof into the back seam.

To assist in an understanding of the above-described sequence of operation of Figs. 7 to 11, inclusive, reference may be had to Figs. 12, 13 and 14 which show the fabric, at the stages of formation of Figs. 8, 9 and 11, respectively, as they actually appear in production, except, as above noted, for natural variations in the form of the fabric from the idealized form indicated.

Figs. 12, 13 and 14 indicate knitting and narrowing elements including narrowing combs 27 having points 28, sinkers 29, dividers 32, knockover bits 33, needles 34 held on a needle bar 37 by clamps 38, a front bed 39, a bar 42 secured to the fabric by hooks 43, and a strap 44 secured at one end to the bar 42 and wrapped around a take-off roller 47 having a shaft 48.

After the production of the complete stocking blank to the form of Fig. 15, the loops of half the loose course 22 are topped onto the needles of a looping machine over the loops of the other half of the course, the ravel area 23 is removed, and the half portions of the course 22 looped to each other to produce a portion of the blank in the form of the loopings E of Fig. 1, or this portion may be formed as a usual seam. The back seam B is subsequently formed between the seam portion of loopings E and the top edge of the stocking, and between the bottom of the heel pocket P and usual loopings formed from the loose course 2 at the tip of the toe portion T.

The structure of Fig. 2 is produced almost identically as above described for the stocking of Fig. 1, except for the manner in which a blank identical with the blank of Fig. 6 is folded and mounted on the needles of the heeler machine.

By comparing Figs. 8 and 17, it is seen that in Fig. 18, the course portions 17b and 18b are reversed from the positions of the corresponding course portions 17 and 18, respectively, of Fig. 8, and that whereas, in the latter figure, each course portion 18 is disposed inwardly of the adjacent course portion 17 from the corresponding edge of the blank, in Fig. 18, each course portion 17b is disposed inwardly of the adjacent course portion 18b from the corresponding edge of the blank. Thus, whereas, in the form of Fig. 1, the first course of the one-piece heel pocket element P has its outer end lengths or course portions knitted to the adjacent course portions 17 of the upper heel areas H of the blank, in the form of Fig. 2, the first course of the one-piece heel pocket element Pb has its outer end lengths or course portions knitted to the adjacent sole course portions 18b of the blank as thus formed. Also, in the form of the invention of Figs. 2, 17, 18 and 19, the hooks 43 and other take-off parts are secured to the fabric, and the leg portion is on top of the foot portion during the knitting of the heel pocket Pb. Fig. 19 corresponds to the stage of operations indicated by Fig. 11, and Fig. 17 shows the finished stocking blank corresponding to Fig. 15; the operation for finishing the stocking being substantially identical, but performed in slightly different order, and producing the results above-mentioned.

Further, in folding the parts to the positions of Fig. 18, the adjacent ends of the course portions 17b, which were originally the outer, or selvage edge, ends thereof, in the form of the blank of Figs. 6 and 7, are overlapped for a distance of one or two needles, or may be further lapped or caused merely to meet, as above set forth.

The procedure in producing the stocking of Fig. 3 is more nearly like the method of making the stocking of Fig. 1, so far as manipulating or folding the blank corresponding to the blank of Fig. 6, and placing it on the needles of the heeler machine are concerned. After this manipulation, the knitting proceeds, as above set forth, with the exception of the elimination of the second set of narrowings represented in Figs. 1 and 2 by the narrowing marks N and Nb, respectively, and in Figs. 10 and 19, as beginning at the courses R and Rb, respectively. Instead, as indicated in Fig. 20, one type of narrowing is carried out to the end of the heel pocket element Pc, to eliminate a loose course corresponding to either of the loose courses 22 and 22b, with the resultant elimination of anything corresponding to the seam portions or loopings E or Eb.

Fig. 21 corresponds to Figs. 15 and 17, and indicates a portion of a similar entire stocking blank for producing the structure of Fig. 3.

In making the structure of Figs. 4 and 22, the operations are substantially the same as in the production of the above-described forms; the blank, after going through the stages corresponding to Figs. 7 to 11, inclusive, culminating in the blank of Fig. 23, which corresponds to the blanks of Figs. 11, 19 and 20 for forming the structures of Figs. 1, 2 and 3, respectively. Since the structure of Fig. 4, is a compromise between the structures of Fig. 1 and Fig. 3, likewise the blank of Fig. 23 has the straight line narrowing along the lines Xd corresponding to the straight line narrowing along the lines Xc of Fig. 20, and a loose course 22d and a ravel area 23d, corresponding to the loose course 22 and the ravel area 23 of Fig. 11, thus to form the loopings Ed of Fig. 4 produced by manipulating the blank of Fig. 24 similarly to the manipulation of the blank of Fig. 15, as above set forth.

As stated above, the blank, as shown in Fig. 8, has been folded about the walewise lines XL and XR, and about the coursewise line Y, to place the course portions 17 and 18 in substantial alignment with each other for topping needle loops of the course portions 17 and sinker loops of the course portions 18 onto adjacent needles. The blank may be thus manipulated entirely by hand, and placed directly onto the needles of the heeler machine, or be so placed onto these needles through the intermediary of a transfer bar.

However, as indicated in Fig. 25, the blank of

Fig. 6 may be placed onto the needles of the heeler machine, not by either of the above methods, but through the use of a topping machine, which does not constitute part of this invention, and portions of which are shown in Figs. 25, 26 and 27. As shown in these figures, the topping machine includes a bar 52 of rectangular cross section, constituting a base or support for a pair of loop-manipulating bar sections 53 and 54. Each bar section 54 is movably hinged, by a hinge having a pin 57, relative to the complemental stationary bar section 53. Needle like loop-manipulating implements or topping points 58 are held to the bar sections 53 by clamps 59, and similar points 62 are held to the bar sections 54 by clamps 63.

In the positions of the parts of Figs. 25 and 27, the bar sections 54 are superposed on the sections 53, with the row of topping points 62 parallel to the row of topping points 58. In this position, as seen in Fig. 27, the outer ends of the lower points 58 protrude forwardly of the outer ends of the points 62, such that the needle loops of the course portions 17 can be topped onto the points 58 a little in advance of topping the sinker loops of the course portions 18 onto the points 62. After this operation, knife blades 64, only one of which is shown, are manipulated to sever the areas 19 to produce the slits 21, whereby the movable topping bar sections 54 may each be turned one hundred and eighty degrees about its hinge pin 57 to position, as shown in Fig. 26, in which all of the points 58 and 62 are in alignment with each other.

Fig. 28 shows more in detail the actual relation of individual loops and courses to the points 58 and 62, and to the hinge pin 57 before the above-mentioned turning movement is effected. Although shown in this diagrammatic representation as of single thread thickness, these loops may be of single or multiple thread thickness. When effected, this movement causes the innermost or farthest right hand topping point 62 to take a position next to the corresponding point 58, in the same row therewith, and spaced therefrom a one-needle distance, the same as any two other points 58 or 62.

Further parts of the topping machine of Fig. 27 shown, are a base or frame 67 on which all of the other parts are mounted, a shaft 68 supported by brackets, such as a bracket 69, on the frame 67, members 72, journaled on the shaft 68, rods 73, each fixed at one end in a socket in the corresponding member 72, sleeves 74, longitudinally slidably mounted on the rods 73, springs 77, around the rods 73 for biasing the sleeves 74 against heads 78, of the rods 73, a bar 79 extending between, and secured to, the sleeves 74, and on which the knives 64 are mounted, and a handle 82 for moving the knives and the supporting elements thereof about the axis of the shaft 68, and for imparting thrust movement of the knives against the action of the springs 77, in the position of Fig. 27, to sever the areas 19. Guards 83, are provided on arms 84, projecting from the brackets 69, and screws 85, in the members 72 engage lugs or stops 86, on the brackets 69.

After the handle 82 has been given its thrust movement to cause the knives 64 to sever the areas 19, thereby providing the slits 21, and the operation has reached the stage of Fig. 26, the blank is then in condition for discharge from the topping machine onto a transfer bar by which it is conducted to the needles of the heeler machine and transferred to these needles.

Means for mounting the transfer bar on the machine of Fig. 27, comprises lever arms 87, fixed to the shaft 68 at opposite ends of the machine, the arms 87 being duplicates, and each embodying a channel portion 88 at its outer or free end having an insert element 89 mounted thereon for adjusting movement longitudinally of the transfer bar, or normal to the plane of the sheet, as indicated in the drawings, by a screw 92 and a slot 93.

With the handle 82, and its associated parts, turned to the left, as viewed in the figure, to position in which the knives 64 are against the guards 83, and the arms 87 turned to the right, in position to place the transfer bar points in position similar to the position of the knives, in Fig. 27, knockover bits 94, held in position on a knockover bit bar 97 by a clamp 98, are moved, upwardly and to the right between the topping points 58 and 62, to transfer the fabric from the topping machine to the transfer bar; it being understood that, when the latter action takes place, the topping points are not in the position of Fig. 27, but in the positions of Fig. 26.

Relative to the form of the invention of Figs. 4, 22, 23 and 24, the full line loops of Fig. 29, although arranged similarly to the loops of Fig. 28, differ therefrom in that, instead of the single course severing area 19, there is provided a sev-ering area having four severing courses 19d between the needle loop course 17d and the sinker loop course 18d. As in the case of the fabric of Fig. 28, the fabric of Fig. 29, although shown diagrammatically as of single thread thickness, also may be of single or multiple thread thickness. The fabric, in Fig. 29, is illustrated in full lines, as it is embodied in a blank similar to the blank of Fig. 6, and has its severing area courses 19d removed, all except the few loops indicated as still in place. Fig. 29 also shows needles 99 of a heeler machine and the loops, certain of which are in full lines and certain of which are in dot-and-dash lines, engaged by the needles when the fabric is manipulated by hand to a shape and position on the straight line needle bank corresponding to the position of the parts in Fig. 8. When the course portions 17d and 18d are topped onto the needles, all of that portion of the fabric to the left of a line XLd, constituting at least one row or series of complete loops extending walewise between the course portions 17d and 18d, will lie at the sides of the needles opposite from the fabric, and will form a slight tuft U on the inside of the fabric which may be removed after the heel pocket element is completed.

In the form of the invention illustrated in Fig. 30, in which parts corresponding to those above set forth are designated by corresponding reference characters each having the suffix e, a heel pocket structure Pe has a back seam portion Ce located similarly to the portion Cb of Fig. 2, but instead of the single line narrowings Mb and Nb of that figure, is provided with narrowings represented by marks U and J, similar to the well known diamond point toe narrowings of full fashioned stockings, extending from the sides toward the rear center of the heel pocket element Pe and connected by a seam portion or loopings A crossing the upper end of the back seam portion Ce, the marks U, at each side of the stocking being substantially parallel to each other and terminating in the convergingly tapered marks J.

The stocking structure is produced, as indicated in Fig. 31, after the blank has been folded and mounted on the needles similarly to the folding and mounting illustrated in Fig. 18.

From the line of the course portions 17e and 18e, the knitting and narrowing proceeds, as in a diamond point toe area, the narrowings being effected by broad combs 102 and 103 on narrowing rods 104 and 105, respectively, and by narrow combs 107 and 108 on narrowing rods 112 and 113.

At the start of this narrowing, the narrow combs 107 and 108 are each spaced a one needle distance inwardly from the associated broad combs 102 and 103, respectively, so that, when each broad comb moves inwardly a two needle distance, the associated narrow comb is moved thereby for a one needle distance. After each such narrowing, the broad combs are retracted a one needle distance, and advanced two needles during the next narrowing, and so on, thus producing the marks U. At the line Re, a covering knife 114 on a lever 115 carried by a covering shaft 117 is lowered to active position whereby to operate to prevent operation of certain of the narrowing points 28e of the narrow combs 107 and 108. Also, at the line Re, the operation of the narrowing combs is changed similarly to the operation of the usual footer machine; the wide combs upon advancing a two needle distance move the narrow combs through a distance of one needle. Prior to the next narrowing operation, the customary one needle spacing between the wide and narrow combs is effected by moving the narrow combs inwardly a one needle distance while the wide combs remain at rest. With the above-described operation of the narrowing combs and covering knife, the diamond point effect is obtained whereby the narrowing marks J are produced along lines constituting continuations or extensions of the lines of the marks U and converging toward a point on a loose course 118 from which the loopings A are produced.

If, at the beginning of the above-described operations, the original blank portion, minus the heel pocket portions, instead of being folded and mounted on the heeler machine as shown, is folded and mounted similarly to the folding and mounting of Fig. 8 or Fig. 23, the back seam portion Ce, instead of extending upwardly from the usual back seam portion in the sole region, will extend downwardly from the back seam portion in the upper heel area.

By the invention, a stocking heel pocket structure or the like, and its method of production, are provided, which have the structural and manufacturing advantages above set forth, and others incident thereto whereby to render the invention a distinct advancement in its field.

Of course, the improvements specifically shown and described by which we obtain the above results, can be changed and modified in various ways without departing from the invention herein disclosed and hereinafter claimed.

We claim:

1. The method of forming on a Cotton type knitting machine a full fashioned stocking blank including an integrally knitted tubular portion, which comprises knitting a portion of a blank and forming a plurality of parallel course portions at each side of a walewise center line of the blank, the course portions at each side being separable out of the plane of the blank and extending inwardly from the corresponding blank edge to a position short of the opposite edge of the blank, cutting the edges of the blank along a given course for a portion of its length at each side, folding the blank along the line of said cut, folding the foot portion of the blank along two walewise lines passing through the ends of said cuts, placing the loops of course portions along the edges of said cuts on the needles with an outer end loop of one of said course portions on the foot side of a cut disposed adjacent the other outer end loop of the same course, and continuing knitting from said course portions to complete said tubular portion and to form a flat knitted narrowed portion, some of which is without a seam, adapted to act as the heel portion of a full fashioned stocking.

2. The method of forming on a straight knitting machine a fabric blank including an integrally knitted tubular portion, which comprises knitting a portion of the blank and forming a plurality of parallel course portions at each side of the walewise center line of the blank, the course portions at each side being separable out of the plane of the blank and extending inwardly from the corresponding blank edge to a position short of the opposite edge of the blank, cutting the edges of the blank along a given course for one-fourth its length at each side, folding the blank along the line of said cut, folding the foot portion of the blank along two walewise lines passing through the ends of said cuts, placing the loops of course portions parallel to said cuts on the needles with the edge loop of one of said course portions of one side of the blank disposed adjacent an edge loop of a corresponding course portion of the other side of the blank, and continuing knitting from said course portions to complete said tubular portion and to form a flat knitted narrowed portion, some of which is without a seam, adapted to act as the heel portion of a full fashioned stocking.

3. The method of forming a full fashioned stocking blank including an integrally knitted tubular portion, which comprises knitting the entire blank except the heel pocket elements and forming walewise opposite parallel course portions at opposite sides of the coursewise blank center in the heel region separable out of the plane of the blank and the parallel course portions at each of said sides each extending from the corresponding edge of the blank inwardly to a position short of said center, cutting the edges of the blank along a given course for one-fourth its length at each side, folding the blank along the line of said cut, folding the foot portion of the blank along two walewise lines passing through the ends of said cuts, placing the loops of course portions parallel to said cuts on the needles with the edge loop of one of said course portions of one side of the blank disposed adjacent an edge loop of a corresponding course portion of the other side of the blank, and continuing knitting from said course portions to complete said tubular portion including the formation of a heel pocket area having a portion without seam.

WESLEY R. McCURDY.
JOHN W. BOYLE.